Figure 1:
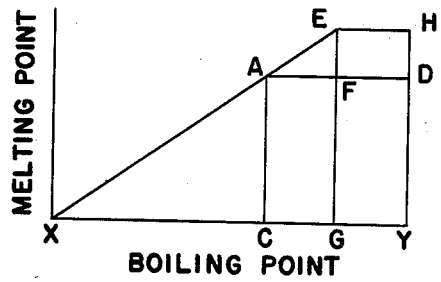
Figure 2:
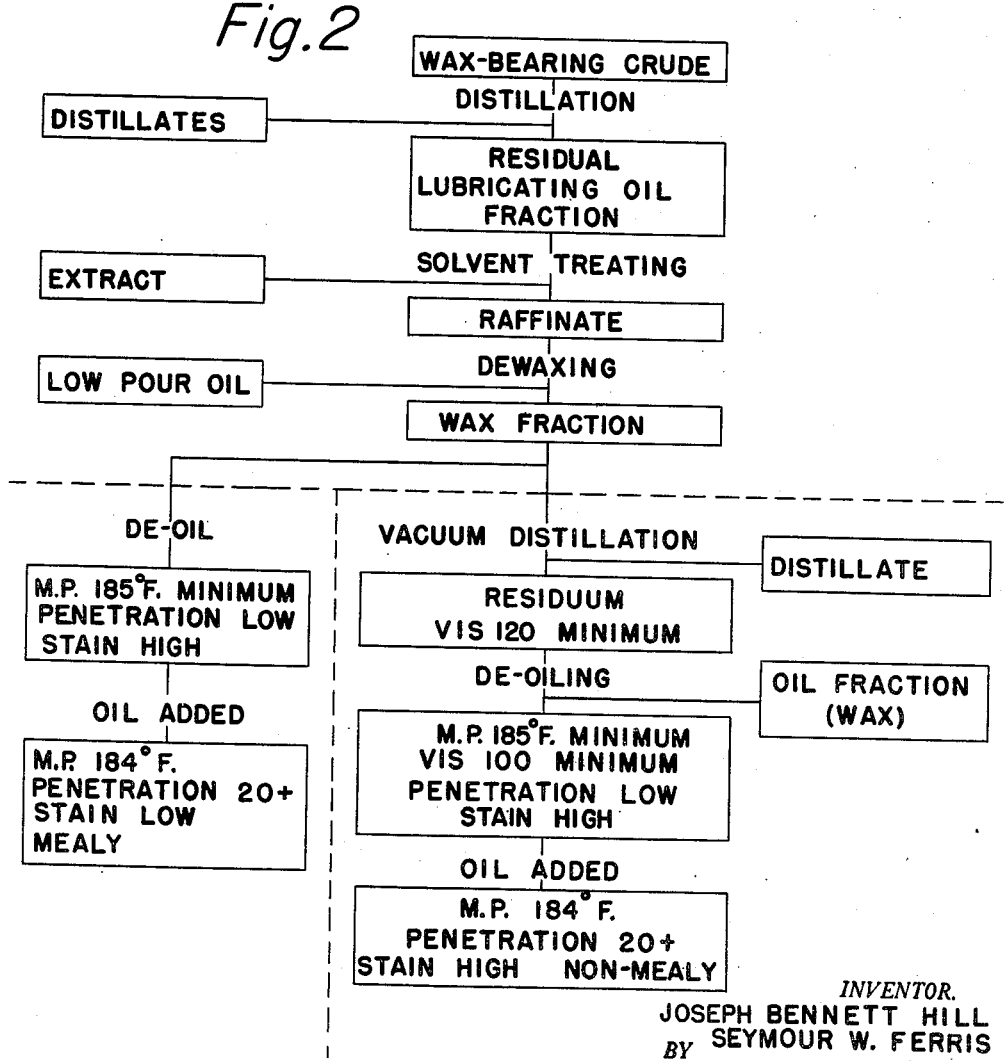

May 27, 1952  J. B. HILL ET AL  2,598,257
WAX PRODUCT AND PROCESS FOR PREPARING THE SAME
Filed May 29, 1948

INVENTOR.
JOSEPH BENNETT HILL
SEYMOUR W. FERRIS
BY
ATTORNEYS

Patented May 27, 1952

2,598,257

UNITED STATES PATENT OFFICE 2,598,257

WAX PRODUCT AND PROCESS FOR PREPARING THE SAME

Joseph Bennett Hill, Wynnewood, Pa., and Seymour W. Ferris, Mount Holly, N. J., assignors to Sun Oil Company, Philadelphia, Pa., a corporation of New Jersey Application May 29, 1948, Serial No. 30,104

4 Claims. (Cl. 196—149)

The present invention relates to a novel petroleum wax product and to a process for preparing said wax product. The novel wax product of this invention is characterized by a high melting point, a high penetration and a high staining temperature preeminently useful for the preparation of laminated paper which is to be used under high temperature conditions as in the hot wrapping of baked products which are to be reheated by the consumer before unwrapping.

Waxes of high melting point and low penetration (i. e. hard) are well known. It has been known to increase the penetration of such waxes by the addition of oil. However, the addition of oil as has been practiced in the art, that is addition of oil to the prior art waxes of high melting point and low penetration, has resulted in a final wax product which is of pasty or mealy character (when rubbed between the fingers) and which has a low or rather unsatisfactory staining temperature. Also, packages made with paper waxed with a wax having a low staining temperature tend to become unsightly upon storage.

It is an object of this invention to provide a novel wax product having a high melting point, a high penetration, a high staining temperature and having a good consistency or non-mealy character.

It is another object of this invention to provide a process for the preparation of said novel wax product.

Other objects and advantages of the invention are apparent from this specification and claims.

In order to clearly define the product of the invention the following criteria are set forth.

Melting points given herein are determined by the A. S. T. M. standard method of test D127–30. All penetrations are determined by A. S. T. M. standard method of test D5–25 under the standard conditions of 100 grams, 5 seconds, 77° F. All viscosities are Saybolt Universal at 210° F.

The stain test referred to herein consists of compressing a pellet of wax between the two halves of a folded paper. The assembly is maintained compressed between the fingers until a good paper-to-wax contact has been ensured. After compression the pellet of wax will be about ½ inch in diameter and about 1/16 inch thick. The paper employed for the test is a non-coated sulfite paper, its essential characteristic, for the purpose of this test, being that any oil thereon will materially increase its translucency to visible light. The paper-wax pellet assembly is placed in an air-bath at a constant temperature for 24 hours. Separate tests are carried out at a series of temperatures, usually increasing by 5° F. increments, and divisible by five, such as 100° F., 105° F., 110° F. etc. Test results are reported in terms of these temperatures. Upon removal from the bath, after the 24 hour period, the folded paper is immediately unfolded and examined before a strong light. If there is noticeable any increased translucency at the place where the paper was in contact with the wax, the test is recorded as "failed." The final result of the test is recorded as "pass at" noting the highest temperature at which no staining or increased passage of light is observed, or "fail at" noting the lowest temperature at which the sample was tested.

The test used to determine adhesion consists of steps which follow. Two sheets of glassine paper, about 2 inches by 6 inches, are thoroughly laminated together under pressure with wax of the kind used commercially to laminate paper in a quantity sufficient to ensure a continuous film of wax between the sheets. The laminated strip is then pulled apart at constant temperature, about 77° F., by inserting it in a conventional apparatus which is designed to create a uniform tension across the two inch edges to cause, as it were, a longitudinal peeling apart of the sheets. The pull is exerted through or against a spring calibrated in grams. The maximum steady reading while the sheets are being peeled apart is recorded as adhesion.

As stated, the invention is concerned with a novel wax product a major inventive characteristic of which is that a high melting temperature is combined with a high penetration without sacrifice of the greatly desired high staining temperature. The higher staining temperature is exceedingly important in many cases of which food wrapping is an excellent example. Food not touched by hands is desired to be hot-wrapped and the product of this invention ensures that the food will not become oil contaminated or have its taste or appearance modified.

The prior art has sought continually to increase the melting point of wax products prepared for use in laminating or coating paper and the like. However, as hereinbefore stated, the products of higher melting point which have been obtained have exhibited brittleness and a low penetration, while the addition of oils to overcome brittleness and to increase penetration has resulted in a low staining temperature.

Thus, wax products having a melting point as high as, say, 170° F. are found to have either a rather low penetration and possibly a high stain temperature, or a desirably high penetration but an undesirably low staining temperature.

For example, one prior art product which had a high melting point (191° F.) was tested for staining, employing the herein described stain test, and was found to fail at 90° F. This material had the desirable penetration of 26 and a viscosity of 81 seconds.

To describe the invention and to point out its essential features reference is made to the drawing wherein Figure I shows the usual melting point versus boiling point relationship diagram of petroleum wax and wherein Figure II shows (a) the conventional oil refinery steps to obtain a dewaxed lubricating oil and a wax fraction (down to the horizontal broken line), (b) the treatment of the wax fraction to obtain the low staining temperature and mealy product of the prior art (below the horizontal broken line and to the left-hand of the vertical broken line), and (c) the steps of the process of this invention to prepare the high staining temperature and non-mealy, novel wax product set forth herein.

In Figure I, the area under the line XAEH represents the wax found in petroleum. The area XAC represents the wax in a wax concentrate recovered by dewaxing a distillate lubricating oil, while the area CAEHY represents the wax similarly recovered from a residual lubricating oil.

When seeking to obtain a high melting point wax product from a wax concentrate such as CAEHY, it has been the prior art practice to recrystallize and to de-oil this wax concentrate to obtain a wax fraction which can be represented as that above line AD. This high melting point wax fraction, has a low penetration and a high staining temperature. Now, when it is sought to increase the penetration of this wax fraction, by the addition of oil, its staining temperature drops quickly and when a desirably high penetration is obtained the staining temperature has become undesirably low.

The process of this invention, as appears below, results in the preparation of the wax fraction above line A D but to the right-hand of line E F. The elimination of the wax fraction which is represented by A E F results in a product having a high oil affinity enabling the addition to it of sufficient oil to increase its penetration to a desirable extent without lowering its staining temperature to an undesirable extent.

Referring to Figure II, the usual wax bearing crude is distilled to provide a residual lubricating oil fraction which, after a solvent treating step, is dewaxed. The wax concentrate thus obtained is the material from which the product of this invention can be made.

In the prior art, the wax concentrate has been de-oiled to obtain the wax fraction above line A D in Figure I. This fraction may have a desirably high melting point and a desirable high staining temperature but it has an undesirably low penetration which prevents it from being desirably suitable for the lamination of paper or other uses requiring a relatively soft wax having a high melting point. Upon the addition of oil to this wax to increase its penetration to about 20, it becomes mealy and its staining temperature becomes undesirably low. The de-oiling and oil-addition steps of the prior art are illustrated to the left-hand of and below the broken lines in Figure II, as already stated.

In the process of the present invention, the wax concentrate is subjected to a vacuum distillation until the bottoms have a boiling point to the right-hand of line E F G in Figure I. This can be accomplished by continuing the distillation until the viscosity of the bottoms is at least 120 seconds. The bottoms, thus obtained, are now de-oiled to produce a wax fraction having a high melting point, say, 185° F., a high staining temperature, say, 130° F., and a low penetration, say, 10. A lubricating oil is now blended into the wax until its penetration has been increased to about 20, after which the product is found to have retained substantially its high melting point, its high staining temperature and is not at all mealy in character.

Thus, according to this invention, the process for the preparation of the novel wax product, set forth herein, comprises the steps of distilling a residual wax concentrate fraction until the bottoms have a viscosity of at least 120 seconds, then recrystallizing said wax bottoms under conditions such that a wax fraction having a melting point of at least 185° F. and a low penetration is obtained and then adding a lubricating oil fraction to said last mentioned wax fraction to increase its penetration to a desired extent.

The successful preparation of the product of the invention appears to be due to the affinity for oil of the de-oiled bottoms resulting from the vacuum distillation of the wax concentrate. This apparent affinity is believed to be due to the crystal structure of the wax included within the area E F D H in Figure I.

In any event, it is to be noted that the process of this invention removes the wax to the left-hand of line E F G as well as the wax below the line A F D, in Figure I, by the combination of the distillation and de-oiling or recrystallization steps. Once these waxes have been removed, the lubricating oil, which may vary in its properties, can be added, to obtain the desired high penetration, without material lowering of the highly desirable high staining temperature. The exact nature and quantity of oil to be added to increase the penetration to the particularly desired extent can best be determined by test.

According to this invention there is prepared a hydrocarbon wax product having a melting point of at least 180° F., a penetration of at least 15 and passing the stain test at 100° F. The viscosity of the product usually will be at least about 120 seconds.

The following is an example of the preparation of a product according to this invention. A wax bearing crude oil was subjected to distillation following which the heavy lubricating residum fraction was refined in usual manner with cresylic acid and propane and the wax-containing raffinate was dewaxed in conventional manner employing a mixture of methyl-ethyl ketone, benzol and toluene as solvent. The wax fraction recovered from the foregoing dewaxing operation had a melting point of about 160° F. and a viscosity of 91 seconds. It was distilled to 50% overhead under a sufficiently high vacuum to avoid decomposition. The bottoms resulting from the last mentioned distillation had a melting point of 177° F. and a viscosity of 158 seconds. These bottoms were diluted with five parts by volume of a mixture consisting of about 42% methyl-ethyl ketone, 50% benzol and 8% toluene. The resulting mixture was heated to effect complete solution and then cooled to about 65° F. to effect crystallization of wax, which was filtered. After removal of solvent from the filter cake, the thus de-oiled wax had the following properties:

Melting point _____ 191
Penetration _____ 10
Stain pass at (°F.) _____ 130
Viscosity _____ 144
Adhesion _____ 4

About 90 parts by (liquid) volume of this wax were blended with about 10 parts of a lubricating oil having the following specifications:

| | |
|---|---|
| A. P. I. | 26.0° |
| Viscosity | 150 |
| Pour °F | 0 |

The resulting wax product, a product according to this invention, had the following characteristics:

| | |
|---|---|
| Melting point | 190 |
| Penetration | 20 |
| Stain pass at (°F.) | 120 |
| Viscosity | 145 |
| Adhesion | 11 |

The wax product of this invention compares favorably in respect of staining with those on the present day market but possesses in addition the much-desired high melting point heretofore attainable only in waxes of low penetration or low staining temperature. It also has a high ductility, good tensile strength and a high penetration.

The table shows a comparison of the properties of the product of this invention with those of two of the presently commercially available offerings.

| | Product of Invention | Commercial Products | |
|---|---|---|---|
| | | A | B |
| Melting point | 190 | 146 | 163 |
| Penetration | 20 | 17 | 31 |
| Viscosity | 145 | 84 | 80 |
| Stain pass at (°F.) | 120 | 125 | 105 |
| Tensile strength lbs./sq. in. at 77°F. | 92 | 92 | 84 |
| Ductility at 77°F [1] | 105 | 98 | 83 |
| Adhesion | 11 | 56 | 16 |

[1] Per cent elongation before break.

The table immediately makes apparent the high melting point attained in the product of the invention. The other properties of the product are in every respect satisfactory for the uses outlined herein and to which are put ordinarily the products "A" and "B".

The wax product of this invention is drastically different from a wax prepared by carrying the step of de-oiling only to such a point that there remains, in the high melting wax fraction, a quantity of the original oil roughly equivalent to the amount of oil which would be added in accordance with this invention. When such a partial de-oiling is carried out, there remains in the product, in addition to the high melting wax and the oil, substantial quantities of all those waxes, of intermediate and low melting points, represented by the area CADY in Figure I. These waxes cause the product to have the undesirable characteristics of mealiness and low staining temperature.

Variation and modification within the scope of the invention as expressed in the appended claims is possible as is apparent from this specification and claims. The essence of the invention is that a novel wax product has been obtained having the novel combination of a high melting point, a high penetration, a high staining temperature, a good consistency and a non-mealy character and that a process has been set forth for the obtaining of said novel product.

We claim:

1. A novel wax product suited to the lamination of paper products required to withstand high temperatures, having a melting point of at least 180° F., an A. S. T. M. penetration of at least 15 and not increasing the translucency to visible light of non-coated sulfite paper when compressed in contact therewith, said paper being characterized in that oil thereon will materially increase its translucency to visible light, and said contact being maintained for 24 hours in an air bath at 100° F.

2. A novel wax product suited to the lamination of paper products required to withstand high temperatures, having a melting point of at least 180° F., an A. S. T. M. penetration of at least 15, a viscosity of at least 120 seconds Saybolt at 210° F. and not increasing the translucency to visible light of non-coated sulfite paper when compressed in contact therewith, said paper being characterized in that oil thereon will materially increase its translucency to visible light, and said contact being maintained for 24 hours in an air bath at 100° F.

3. A novel wax product suited to the lamination of paper products required to withstand high temperatures, having a melting point of about 190° F., an A. S. T. M. penetration of about 20 and not increasing the translucency to visible light of non-coated sulfite paper when compressed in contact therewith, said paper being characterized in that oil theron will materially increase its translucency to visible light, and said contact being maintained for 24 hours in an air bath at 120° F.

4. A novel wax product suited to the lamination of paper products required to withstand high temperatures, having a melting point of about 190° F., and A. S. T. M. penetration of about 20, a viscosity of about 145 seconds Saybolt at 210° F. and not increasing the translucency to visible light of non-coated sulfite paper when compressed in contact therewith, said paper being characterized in that oil thereon will materially increase its translucency to visible light, and said contact being maintained for 24 hours in an air bath at 120° F.

J. BENNETT HILL.
SEYMOUR W. FERRIS.

REFERENCES CITED

The following references are of record in the file of this patent:

UNITED STATES PATENTS

| Number | Name | Date |
|---|---|---|
| 2,306,201 | Wiles | Dec. 22, 1942 |
| 2,348,689 | Abrams et al. | May 9, 1944 |
| 2,441,202 | Maier et al. | May 11, 1948 |

OTHER REFERENCES

Warth, "The Chemistry and Technology of Waxes," page 249. Published by Reinhold Publishing Corporation, New York, N. Y., 1947.